F. CRAWFORD, Sr.
STOP MOTION FOR KNITTING MACHINES.
APPLICATION FILED NOV. 27, 1915.

1,212,912.

Patented Jan. 16, 1917.
5 SHEETS—SHEET 1.

Inventor
Frank Crawford, Sr.
by his Attorneys

F. CRAWFORD, Sr.
STOP MOTION FOR KNITTING MACHINES.
APPLICATION FILED NOV. 27, 1915.

1,212,912.

Patented Jan. 16, 1917.
5 SHEETS—SHEET 4.

Inventor:
Frank Crawford, Sr.
by his Attorneys

F. CRAWFORD, Sr.
STOP MOTION FOR KNITTING MACHINES.
APPLICATION FILED NOV. 27, 1915.

1,212,912. Patented Jan. 16, 1917.
5 SHEETS—SHEET 5.

UNITED STATES PATENT OFFICE.

FRANK CRAWFORD, SR., OF NEW BRUNSWICK, NEW JERSEY, ASSIGNOR TO THE CRAWFORD MANUFACTURING COMPANY, OF NEW BRUNSWICK, NEW JERSEY, A CORPORATION OF NEW JERSEY.

STOP-MOTION FOR KNITTING-MACHINES.

1,212,912.   Specification of Letters Patent.   Patented Jan. 16, 1917.

Application filed November 27, 1915. Serial No. 63,796.

*To all whom it may concern:*

Be it known that I, FRANK CRAWFORD, Sr., a citizen of the United States, and a resident of New Brunswick, county of Middlesex, State of New Jersey, have invented certain Improvements in Stop-Motions for Knitting-Machines, of which the following is a specification.

My invention relates to certain improvements in stop motions which are actuated when a loose end appears or when a thread breaks or when a thread is under tension due to a knot in the thread or when a thread catches on a bobbin.

The invention is particularly adapted for use in connection with knitting machines in general and the particular mechanism shown in the drawings is adapted to machines of the type in which the bobbins are located above the knitting head, but it will be understood that it may be used in other types of knitting machines without departing from the essential features of the invention.

The broad idea of this invention is fully set forth and claimed in an application for patent filed by me on the sixth day of November, 1915, under Serial No. 59,996.

The object of the present invention is to provide mechanism consisting of two connected elements, one element governing the stop motion when tension is applied to the thread, and the other element actuating the stop motion when the thread breaks.

The invention also relates to details of construction which will be fully described hereinafter.

In the accompanying drawings: Fig. 4$^a$ is a sectional plan view on the line $e$—$e$, Fig. 5, with the disk removed; Figs. 6, 7, 8, and 9 are perspective views of details of the mechanism illustrated in Fig. 5; Fig. 10 is a view of the connecting rod through which the upper mechanism actuates the lower mechanism.

Referring to the drawings, 1 is the head of the knitting machine of any ordinary type.

2 is the bracket carrying the bobbins 3.

4 is a post mounted on the frame 5 of the knitting head and extending into the opening of this post is a shaft 6 having an arm 7 thereon which is connected by a rod 8 to an arm 9 on a shaft 10 mounted in a bearing 11 carried, in the present instance, by a bracket 2 and having an arm 12 at its lower end arranged to engage the stop mechanism of the knitting head so that when the shaft 6 is turned the shifting mechanism of the knitting machine will be operated, which will immediately stop the rotation of the machine. While I have shown a particular form of connection between the shaft 6 and the shifting mechanism of the machine, it will be understood that this mechanism will be modified to accommodate different types of machine to which the invention is applied.

13 is the casing of the lower stop motion and 14 is the casing of the upper stop motion. The upper stop motion is connected to the lower stop motion by a tubular standard 15, of any length desired, supported in the present instance by a cap 13$^a$ of the lower stop motion. The cap 14$^a$ of the upper stop motion has an extension 14$^b$, which is adapted to a bearing on a bracket or other supporting device 16.

Figures 1, 2, 14, 15, 16, 22, 23:
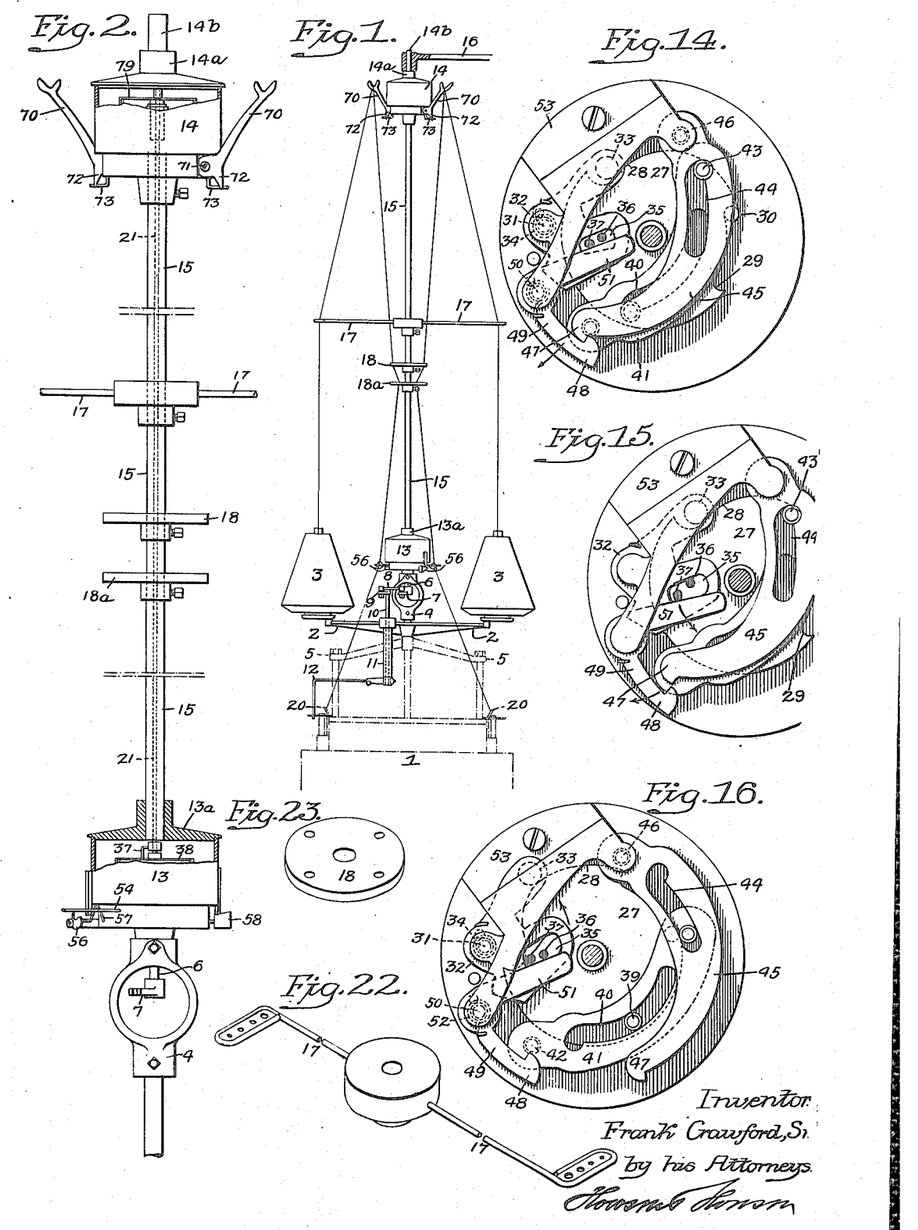
Figure 1 is a view in elevation illustrating my improved stop motion and showing the knitting head in dotted lines.
Fig. 2 is an enlarged side view, partly in section, illustrating the upper and lower mechanism for actuating the stop motion.
Fig. 14 is an enlarged sectional view of the trip mechanism illustrated in Fig. 12, drawn to an enlarged scale and showing the parts in engagement.
Fig. 15 is a view similar to Fig. 14, showing the parts released.
Fig. 16 is a view showing the trip pins retracted.
Fig. 22 is a perspective view of the thread guide.
Fig. 23 is a perspective view of one of the tension disks.
Figure 3:
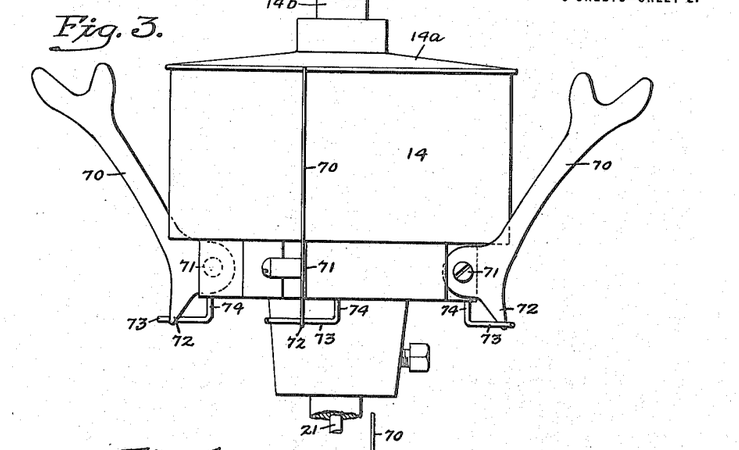
Fig. 3 is a side view of the upper mechanism actuated when the thread is under tension.

17 is a thread guide of the construction clearly illustrated in Fig. 22 having arms in which is a series of holes of different diameters for the passage of the thread from the bobbin 3. The hole is of sufficient diameter to allow the free passage of the thread, but will engage any knot or any enlargement of the thread and will stop the movement of the thread and will place tension on that portion of the thread between the guide and the needles, causing the operation of the upper stop motion. The thread passes from the guide 17 over one of the notched levers 70 of the upper stop motion, down through the perforations in the two tension plates 18 and 18ª, shown clearly in Fig. 23, down to the lever 56 of the lower stop motion and from this lever to the guides 20 on the knitting machine. If a thread breaks, then the lever 56 drops and releases the trip mechanism which, in turn, shifts the driving mechanism of the knitting machine. The upper mechanism is connected to the lower mechanism through a shaft 21 in the tubular standard so that a single trip mechanism, such as illustrated in Figs. 14 and 15, which is located in the lower casing 13, is actuated by both stop motion mechanisms.

Referring to Figs. 11 to 21 inclusive, I will describe the mechanism contained in the lower casing. 6 is the shaft coupled to the shifting mechanism of the knitting machine, as described above, and this shaft extends through an elongated bearing 22 having a flange 23 at its upper end and secured to the extension 24 of the casing 13, and mounted on the exterior of this bearing 22 is a coiled spring 25, the upper end of this spring being attached to the bearing and the lower end of a collar 26 secured to the shaft 6. This spring is of sufficient strength to shift the mechanism for tripping the shifting mechanism of the knitting machine. After the stop motion is released to stop the machine, the shaft 6 is turned to again place tension on the spring and the shaft is held with its spring in tension by the trip mechanism, which I will now describe. On the upper end of the shaft is a cam 27, shown clearly in Fig. 17, having an eccentric portion 28 forming the cam and recessed at 29 to form two stops. A pin 30 on the flange 23 of the bearing 22 limits the movement of the cam, being located in the slot 29 of the disk. Mounted on a pin 31 on the flange 23 is a lever 32 having a roller 33 which bears against the cam 28. A spring 34 on this lever tends to retain the roller in contact with the cam and it is slotted at 35 for the reception of the trip pins 36 and 37. The pin 36 projects from the disk 38 mounted in the lower casing and the pin 37 projects from the shaft 21 which extends through the tubular standard 15 from the upper casing. On the cam disk is a pin 39 which enters a slot 40 in a lever 41 mounted on a stud 42 in the bearing 22 and on the outer end of this lever is a pin 43 which extends into a slot 44 in a lever 45 pivotally mounted on a stud 46 on the flange 23 of the bearing 22. The two levers 41 and 45 form a compound lever. The slot in each lever has a lateral extension at the pivot end so that when the levers are in the latched position, as in Fig. 14, the pins rest in these notches. The lever 45 has a hook 47 which is engaged by a hook 48 on a trip lever 49 mounted on a pin 50. One arm 51 of this lever is located in the path of the trip pins 36 and 37 so that when either one of these trip pins is moved in the direction of the arrow, Fig. 15, by the breaking of the thread, or excessive tension on the thread, it will press upon the arm 51 of the lever 49, as illustrated in Fig. 15, and will force the nose 48 of said lever out of engagement with the lever 45. As soon as this occurs, the compound levers 45 and 41 are released and this releases the heavy spring 25 which uncoils and turns the cam disk 27, bringing the cam portion under the roller 23, forcing the lever 32 out in the direction of its arm, Fig. 16, so as to return the pin that actuated the lever 51 to its normal position and the spring of the lever 49 will cause the lever to follow the pin to its normal position. This motion resets the stop mechanism, in order to reset the trip mechanism consisting of the disk and the compound lever. The shaft 6 is turned so as to place the spring 25 under tension, the spring being held in this position by the compound levers, the nose of the lever 45 snapping back of the nose 48 of the lever 49. The object of this construction is to allow either one or both of the trip pins to be returned to their normal positions so that the stop motion mechanism can be rethreaded prior to the resetting of the shifting mechanism and prior to placing the spring 25 under tension. 53 is a bearing plate which is secured to the bearing 22 and has portions which rest over the pivots of the levers 45, 49 and 32.

Figure 11:
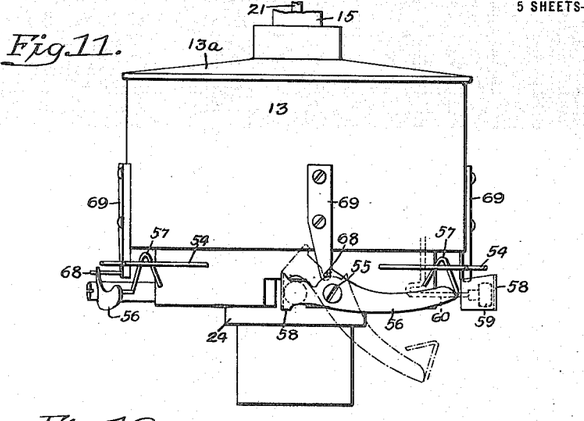
Fig. 11 is a side view of the lower mechanism which is actuated when a thread breaks.
Figure 12:
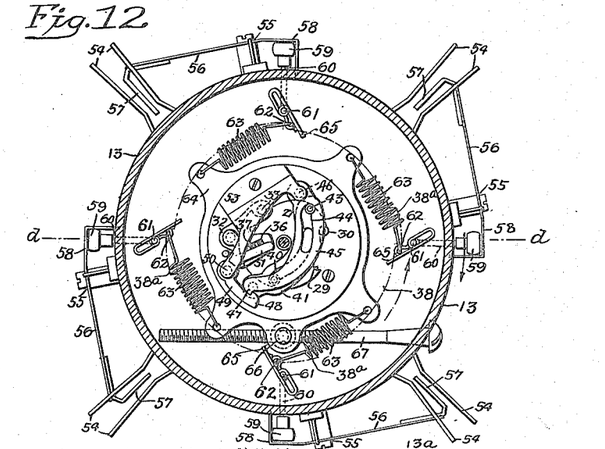
Fig. 12 is a sectional plan view on the line $c$—$c$, Fig. 13.
Figure 13:
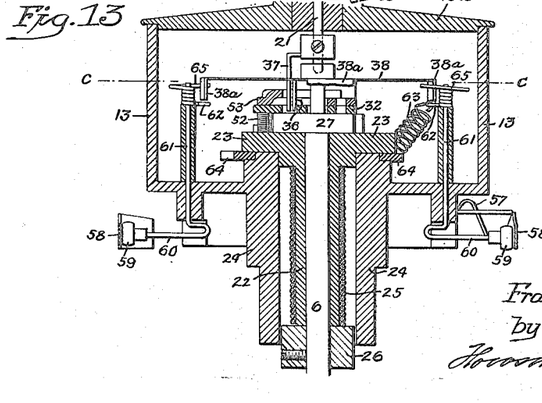
Fig. 13 is a sectional elevation on the line $d$—$d$, Fig. 12.
Figures 17, 18, 19, 20, 21:
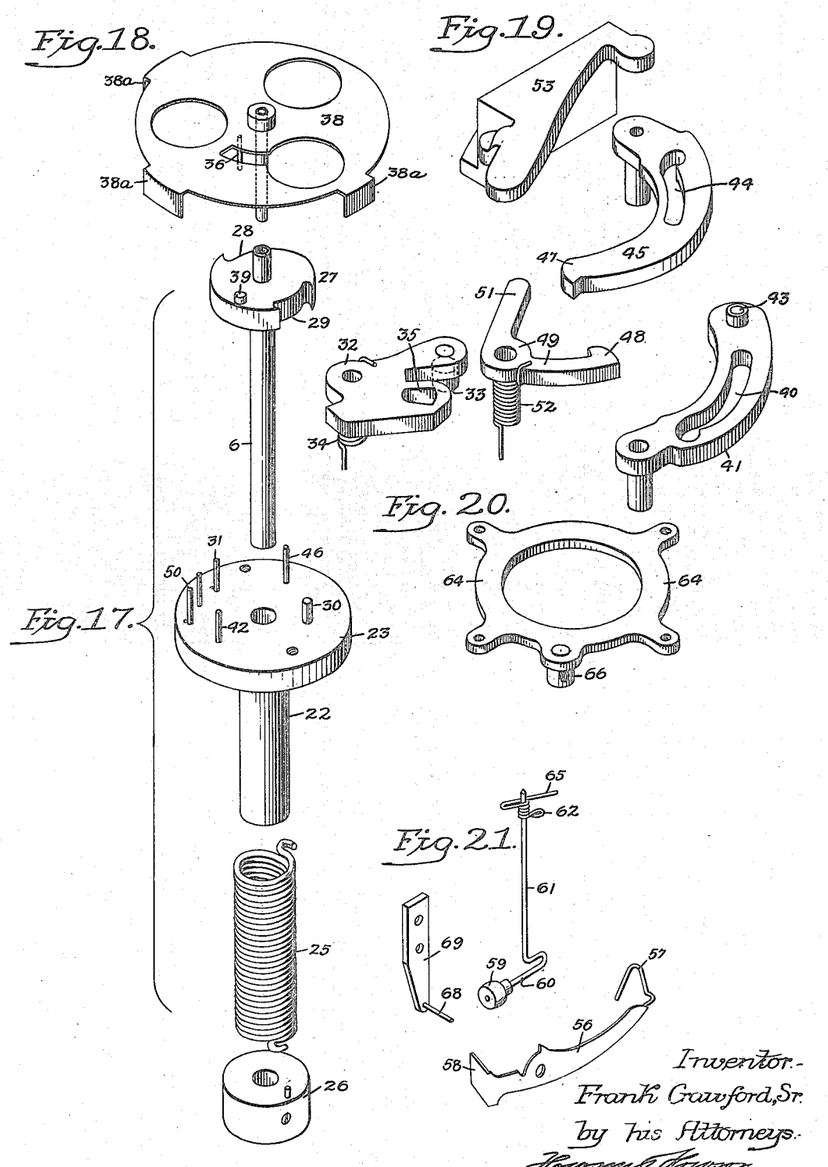
Fig. 17 is a detached perspective view, showing the two shafts and spring of the mechanism illustrated in Fig. 13.
Fig. 18 is a detached perspective view of the tripping plate.
Fig. 19 is a detached perspective view illustrating the levers of the tripping mechanism.
Fig. 20 is a detached perspective view of the regulating plate.
Fig. 21 is a detached view of one of the individual trip mechanisms controlled by the thread.

In Figs. 12 and 13 of the drawings, I have illustrated a device controlled by four threads, while in Fig. 1 I have shown a device controlled by two threads, but it will be understood that the stop motion is designed to take care of any number of threads, according to the type of knitting machine to which it is applied. Some machines have only one thread, while others have as many as thirty-two threads. The number of trippers will depend upon the number of threads. Projecting from the side of the casing 13 is a series of pairs of guides 54 for the thread, each consisting, in the present instance, of two bars forming a fork. 56 is a series of trip levers pivoted at 55 to the casing and having a hook portion 57 which extends through the forked guide 54. The thread passes over this guide and under the hook 57. Thus the thread supports the hook and its lever 56 in the elevated position. At the opposite end of the lever is a plate 58, which rests in front of the roller 59 on the arm 60 of the trip shaft 61 when the lever 56 is in the raised position, as shown in Fig. 11, but should a thread break, then the lever drops to the position shown in dotted lines, Fig. 11, and the plate 58 is raised clear of the roller 59. As the shaft 61 has an arm 62 which is connected to a spring 63 attached to the regulating plate 64, the arm 60, with the roller, will swing in the direction of the arrow, Fig. 12, when released, and on the end of the shaft 61 is an arm 65 which rests back of one of the depending arms 38ª on the tripping plate 38 and moves the plate in the direction of the dotted arrow, Fig. 12, due to the tension of the spring, and as the pin 36 is carried by this plate it will actuate the trip lever 49, as above described. As soon as the mechanism is tripped, the trip plate is moved back to its normal position through the medium of the cam surface 28 of the cam disk 27 and the lever 32, and this action will turn the shaft 61, bringing the roller to its normal position so that, when the operator threads the hook 57, the lever will be raised and the plate 58 will move back of the roller 59, holding it in position against the tension of the spring and then each shaft 61 is under the control of its trip lever 56 and, in the event of any one of the threads breaking, the trip mechanism will be released and the machine will be stopped.

In order to adjust the springs 63, I make the regulating plate 64 adjustable on the casing 13 and mount on this plate a swivel nut 66 through which passes an adjusting screw 67. The head end of this screw extends through and has its bearing in the casing 13, as shown clearly in Fig. 12, so that on turning this screw in one direction the tension will be applied to the springs and, on turning the screw in the opposite direction, the tension will be released and, on turning the screw, the trip mechanism can be regulated to a nicety.

The movement of the trip lever 56 is limited by a stop pin 68 on a bracket 69 to the side of the casing 13. The above described mechanism actuates the trip mechanism when a thread breaks and I will now describe the upper mechanism located in the casing 14 which is actuated when a thread is under tension, due to a knot being caught in the guide 17 or a thread being caught at the bobbin which will draw down any one of the notched levers 70, which are pivoted to the casing 14, causing the mechanism in the casing to transmit this motion to the rod 21 and trip pin 37 to actuate the trip lever 49 in the lower casing.

Each lever 70 is pivoted at 71 to the casing 14 and has a short arm 72 against which bears an arm 73 on a shaft 74 and at the upper end of this shaft is an arm 75 to which is attached a spring 76 having its opposite end secured to a regulating plate so that the tension of the spring can be regulated. On the extreme upper end of the vertical shaft 74 is an arm 77, which rests back of one of the arms 78 on the disk 79 which has an extended stem 80 mounted in the bearing 81 formed integral with the casing 14. This disk is attached to the connecting rod 21 by a set screw 82 so that any motion imparted to the disk 79 will be transmitted through the rod 21 and trip pin 37 to the trip mechanism in the lower casing. The tripping disk 79 is held against the arms 77 by a light spring 83 attached to an arm 84 on the disk and to the casing at 85, Fig. 4ª, so that as soon as one of the notched levers 70 is drawn down, due to the tension on a thread, the shaft 74 will be turned against its spring 76 and will turn the tripping disk 79, placing the spring 83 in tension, and when the notched lever 70 is released the spring 76 returns its shaft 74 to its normal position, raising the arm 70 to its normal position ready to be threaded, the spring 83, in the meantime, retracting its disk 79, rod 21 and pin 37 to their normal positions.

Figure 4:
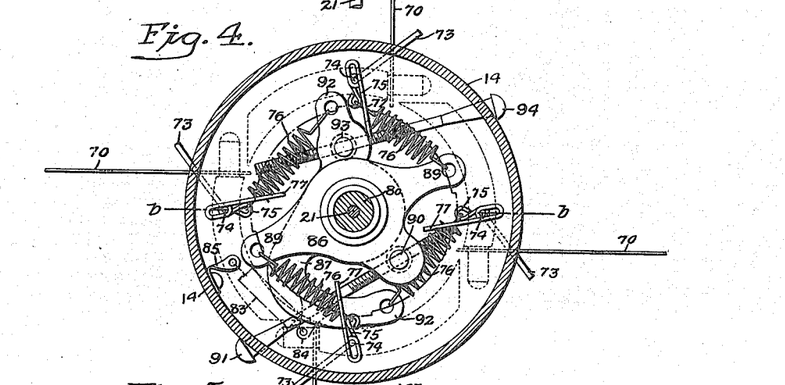
Fig. 4 is a sectional plan view on the line $a$—$a$, Fig. 5.
Figures 4A, 6, 7, 8, 9, 10:
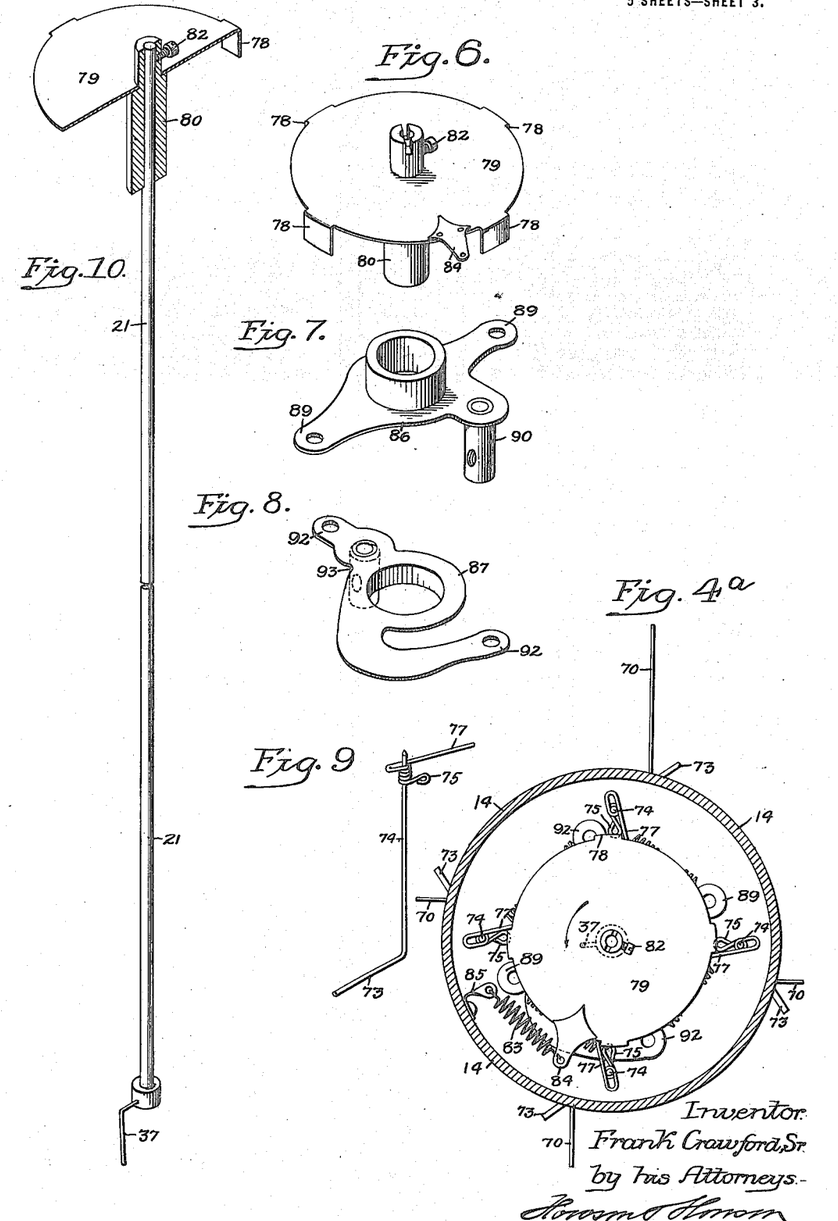
Figure 5:
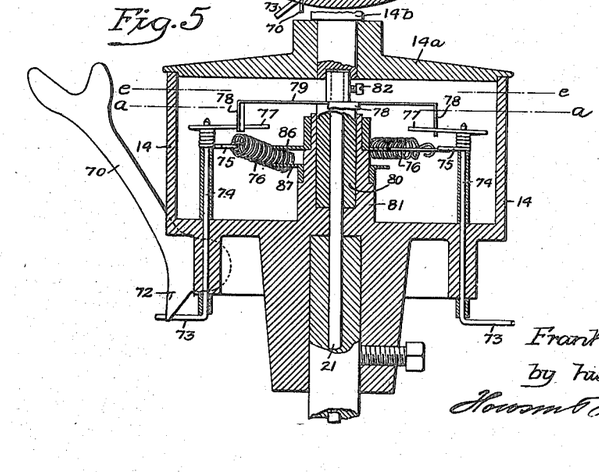
Fig. 5 is a sectional elevation on the line $b$—$b$, Fig. 4.

As illustrated in Figs. 4, 7, and 8, I have provided two regulating plates for the springs 76, one plate 86 being mounted above the other plate 87 and both being mounted on the bearing 81 of the casing 14, the bearing being stepped, as shown in Fig. 5, to support these plates. The plate 86 has two arms 89 to which the two opposite springs are attached and has a swivel nut 90 through which passes an adjusting screw 91 mounted in the casing and the plate 87 has two arms 92 to which the other two springs are attached and an adjusting screw 94 mounted in the casing passes through the swivel nut 93. By this construction, two diametrically opposite trip shafts can be adjusted by a single tension mechanism and the other trip shafts can be adjusted by the other tension mechanism. This is necessary where threads differing in strength are used, but is not necessary where all of the threads are of the same strength, as the construction illustrated in Fig. 12 may be used.

The operation is as follows: If the mechanism is applied to a machine with two threads, as in Fig. 1, then a thread for each bobbin is passed through a guide plate 17 over a forked arm 70, down through one of the holes in the tension plate 18, then through a hole in the tension plate 18ᵃ over the forked guide 54 and under a hook 57 of a trip lever 56 to a guide at the needles. When the machine is set in motion the thread passes without interruption until a thread breaks or a loose end occurs, or when tension is applied to the thread, due to a knot catching in the guide plate 17, or the thread being caught at the bobbin. In the first instance, if a thread breaks, or a loose end occurs, then a trip lever 56 drops, releasing the shaft 61, which will turn, due to the tension of its spring, and an arm on this shaft will engage and turn the trip plate 38 and its pin 36 will actuate the trip mechanism shown in Fig. 14 which, when released, will stop the machine, due to the release of the main spring 25. As soon as the spring is released, the lever 32 is forced back by the cam on the disk 27 and the pin 36 will be returned to its normal position, resetting the disk 38 and the shaft 61 will be turned to its normal position, so that when the thread is again passed under the lever 56 and the main spring is again placed under tension, then the shaft will be held in its normal position by the lever 56.

Should an excessive tension be applied to a thread then one of the levers 70 of the upper element will be drawn down with such force as to cause its shaft 74 to turn and engage and turn the plate 79 against the tension of the spring 76 connected to the shaft and the light spring 83 connected to the plate. This motion will be imparted through the connecting rod 21 and trip pin 37 to the trip mechanism illustrated in Fig. 14, forcing the lever 49 out of engagement with the compound lever, as in Fig. 15, releasing the main spring 25, which will force the shaft 6 and the disk 27 to turn and stop the machine. As the disk 27 is turned the cam section 28 of the disk will turn the lever 32 against the pressure of its spring and as the pin 37 is in the slot of the lever it will be drawn back to its normal position with the aid of the light spring 83. As soon as the thread is broken or the knot is removed, the arm 70 is released and the spring 76 will turn the shaft 74, causing the lever 70 to be raised to its normal position and kept in the raised position by the spring, the arms of the disk 79 being held against the arms 77 by the light spring 83. The parts are then in position for rethreading before the shaft 6 is turned by hand to again place the spring 25 under tension.

While I have shown my improved stop motion with the two casings 13 and 14 spaced a considerable distance apart so as to allow sufficient slack to the thread, in some instances the two casings may be arranged comparatively close together. Although I have shown them mounted centrally with respect to the knitting machine, in some types of machines they may be arranged at one side or in other positions, depending upon the type of machine, without departing from the essential features of the invention.

While my invention is particularly adapted for use in connection with knitting machines, it may be used in connection with other machines where it is desired to stop the machine when a thread breaks or when the thread is under excessive tension.

I claim:

1. The combination in a stop motion for knitting machines, of a single spring-actuated mechanism; controlling means for stopping the machine; a single trip mechanism for holding the spring in tension; two stop motions, one arranged above the other, the upper stop motion having a rotating device mounted on a shaft having an arm at its lower end arranged to come in contact with the trip mechanism; a series of stop motion levers arranged to release the rotating device when extra tension is applied to a thread of a series, the other stop motion having a rotating device and having a pin arranged to actuate the trip mechanism when the device is rotated; and a series of arms arranged to release the rotating device when a thread breaks so that the machine will be stopped when a thread is under excessive tension or when it is broken.

2. The combination in a stop motion for knitting machines, of a spring-controlled trip mechanism; controlling means for stopping the machine actuated by said trip mechanism; a single means for holding the spring in tension; two stop motions, one located above the other, each stop motion having a rotatable disk; a pin arranged off center carried by the lower disk and arranged to engage the trip mechanism; a shaft carrying an upper disk and having a pin also arranged off center to engage the trip mechanism; an arm over which the thread passes and arranged to hold the upper disk; a trip lever for holding the lower disk; means for independently turning one disk when a thread breaks or a loose end occurs; and means for turning the other disk when a thread is under excessive tension, whereby the disks are free to rotate causing their pins to actuate the trip mechanism.

3. The combination in a stop motion for knitting machines, of a casing supported by the machine; a single trip mechanism in the casing; a lever held in position by the thread leading from the bobbins to the knitting machine; a standard projecting from the casing; a second casing supported by the standard; lever mechanism on the second casing over which the thread passes; a rotatable shaft extending through the standard and connected to the upper lever mechanism, each mechanism having an arm for independently actuating the trip mechanism when a thread breaks or excessive tension is applied to the thread.

4. The combination in a stop motion, of two casings; a hollow standard connecting the two casings; a shaft in the lower casing; an arm on the shaft; means connecting said arm with the shifting mechanism of the machine to which the stop motion is applied; a notched lever pivotally mounted on the upper casing over which the thread is passed; a spring-controlled shaft having an arm arranged to hold the lever in its raised position; a second arm on said shaft arranged to engage a disk; a shaft extending through the standard to which the disk is attached; a trip arm on the lower end of said shaft; trip mechanism in the lower casing arranged to be actuated by said arm when a thread is under excessive tension; a pivoted arm mounted on the lower casing and having a hook; thread guides between which the hook extends so that the thread will pass over the guides and under the hook; a spring-controlled shaft held in tension by said lever; an arm at the upper end of said shaft; a trip plate arranged to be actuated by said arm and having a trip pin, also engaging the trip mechanism so that, when a thread is under excessive tension, the upper device will actuate the trip mechanism and when a thread breaks, or a loose end appears, the lower device will actuate the trip mechanism.

5. The combination in a stop motion for knitting machines, of a casing mounted above the knitting machine; a shaft mounted in the casing; a disk carried by the shaft and located within the casing; a vertical shaft also located in the casing and having an arm arranged to engage the disk and having a second arm extending on the outside of the casing; a lever pivoted to the casing and arranged to receive a thread, said lever engaging the arm of the shaft on the outside of the casing; a second casing; trip mechanism therein consisting of a trip lever; a compound lever held by the said trip lever; a shaft controlled by the compound lever; a spring connected to the shaft and held under tension by the compound lever; controlling means for stopping the machine coupled to the shaft, the first mentioned shaft having an arm arranged to engage the trip lever so that when the other lever is drawn down it will release the mechanism and will stop the rotation of the machine.

6. The combination in a stop motion for knitting machines, of trip mechanism consisting of a disk; a shaft to which the disk is secured; two slotted levers; a pin on the disk adapted to the slot in one lever; a pin on said lever adapted to the slot in the other lever and forming a compound lever; a trip lever engaging the last mentioned lever and having an arm, with two pins arranged to release the said trip lever; and two stop mechanisms, one pin being connected to one mechanism and the other pin being connected to the other stop mechanism.

7. The combination in a stop motion, of a trip mechanism consisting of two slotted levers forming a compound lever; pivots therefor; a disk having a pin arranged to enter one of said levers; a pin on one lever entering the slot in the other lever; a trip lever engaging the last mentioned lever; a cam on the disk; a lever having a roller adapted to bear against the cam and slotted; two stop mechanisms each having a pin entering the slot in the last mentioned lever and arranged to actuate the trip lever, the cam-actuated lever returning the actuating pin to its normal position after the trip mechanism is tripped to stop the machine.

8. The combination in a stop motion for knitting machines, of a trip mechanism consisting of a disk; a shaft on which the disk is mounted, said disk having a cam surface thereon; a lever having an arm carrying a roller adapted to bear against the cam surface of the disk and having a slotted arm; two stop mechanisms each having a pin, both pins extending into said slot; a trip lever having an arm arranged in the path of the pins; a compound lever consisting of two slotted levers, the disk having a pin arranged to enter the slot in one lever, said lever having a pin arranged to enter the slot in the other lever, the last mentioned lever being engaged by the trip lever; and a spring for imparting movement to the disk in one direction, said spring being held in tension by the trip lever.

9. The combination in a stop motion for knitting machines, of a casing; a notched lever pivoted to the casing over which the thread passes; a vertical shaft having an arm engaged by one arm of the lever; a shaft; a disk having an arm; an arm on said vertical shaft engaging the arm on the disk; a spring attached to the shaft and arranged to return said shaft after it is moved by the pull of the thread; and means connecting the disk with the stop mechanism of the machine.

10. The combination in a stop motion for knitting machines, of a casing; a shaft mounted in the casing; a disk on one end of said shaft having an arm; a pin on the other end of said shaft; trip mechanism arranged to be released by said pin when the disk is turned; a notched lever pivotally mounted on the casing and around which the thread passes; a vertical shaft having an arm at each end, one arm bearing against the notched lever and the other engaging the arm on the disk; and a spring for moving the said shaft in one direction so that, when the lever is drawn down, the shaft will turn the disk which actuates the stop mechanism.

11. The combination in a casing, of a trip mechanism connected to the stop mechanism of the machine to which the stop motion is applied; a disk having a pin arranged to trip the trip mechanism and having an arm; a vertical shaft mounted in the casing and having an arm arranged to engage the arm of the disk and having a spring; an arm on said shaft having a roller; and a trip lever pivoted to the casing and having a hook portion on one arm under which the thread passes and having a plate on the other arm back of which the roller is retained when the stop motion is threaded so that, on the release of the trip lever due to a breaking of a thread, the trip lever will drop and will release the vertical shaft which will move the disk and will actuate the trip mechanism.

12. The combination in a stop motion, of a casing; four levers pivoted to the casing; a vertical shaft located at each lever, the shaft having upper and lower arms, the lower arms engaging the said levers; a disk engaged by the upper arms; means connecting the disk with a trip mechanism; two pivoted plates; springs connecting one of the plates with two of the vertical shafts; springs connecting the other plate with the other two of the vertical shafts; and means for independently adjusting the plates so as to regulate the tension of the springs.

FRANK CRAWFORD, Sr.